2,602,613

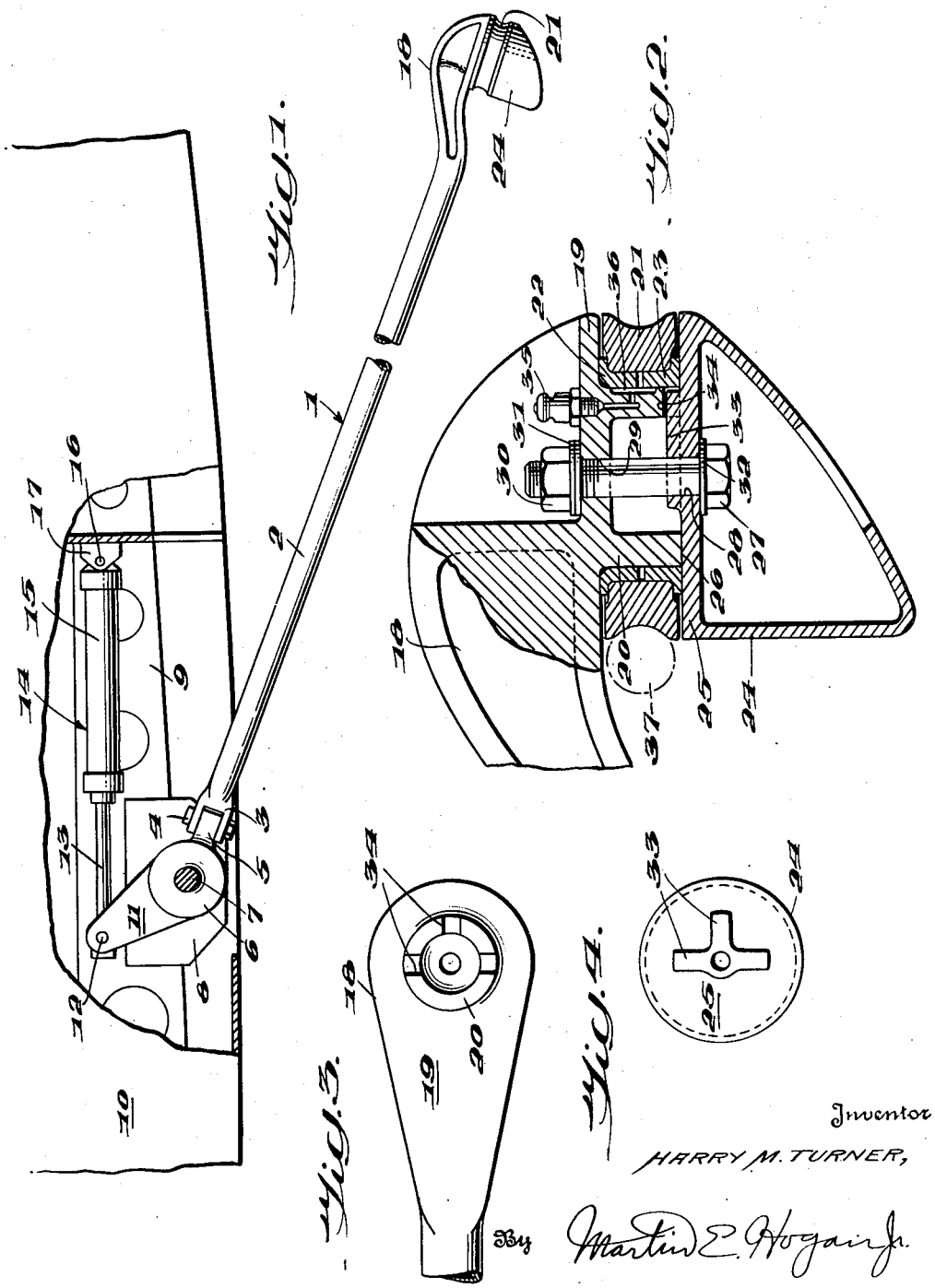
July 8, 1952 — H. M. TURNER — 2,602,613
ROLLER TYPE ARRESTING HOOK
Filed March 1, 1949
Inventor
HARRY M. TURNER,
By Martin E. Hogan Jr.
ATTORNEY Patented July 8, 1952

UNITED STATES PATENT OFFICE 2,602,613

ROLLER TYPE ARRESTING HOOK

Harry M. Turner, Dundalk, Md., assignor to The Glenn L. Martin Company, Middle River, Md., a corporation of Maryland Application March 1, 1949, Serial No. 79,061

2 Claims. (Cl. 244—110)

This invention relates to an improved arresting hook for use with carrier-based aircraft.

In landing aircraft on the deck of an aircraft carrier, it is common to employ an arresting hook depending from the rear portion of the fuselage of the airplane and adapted to engage an arresting cable stretched across the landing deck slightly above the surface thereof to decelerate the airplane. The conventional arresting hook, as its name implies, constitutes a relatively broad hook-like element which directly engages the cable. As the size and weight of carrier-based aircraft has increased, the forces involved in such an arresting operation have become increasingly large. If the landing hook engages the cable slightly to either side of the center thereof, or if the airplane in approaching is not perfectly aligned with the direction of movement of the carrier, there is a tendency for the hook to move laterally along the cable. With the extremely high forces involved, the friction is so great with the conventional hook that the hook tends to chatter or vibrate along the cable causing undue wear of the cable and setting up vibration forces within the hook, and at times within the structure of the plane itself, sufficient to cause fatigue of the parts and eventually to cause structural failure thereof.

It is an object of this invention to provide an improved arresting hook which will overcome the above objections. This is done by providing a roller on the hook so positioned that upon engagement of the hook with the cable, the latter will move onto the surface of the roller, any lateral movement of the hook along the cable thereafter being freely permitted with a minimum of friction, by rotation of the roller during such lateral movement.

It is a further object to provide a roller-type arresting hook having a tip portion of such configuration as to readily guide the cable into engagement with the roller.

It is a further object to so position the roller on a roller-type arresting hook that it lies substantially in the same plane as the axis of the hook shank, whereby the forces involved are distributed in the most advantageous manner.

Further objects and advantages will become apparent from a study of the description and claims when considered in the light of the accompanying drawing.

In the drawing, Figure 1 is a fragmentary side view of the rear portion of an airplane showing the improved arresting hook applied thereto.

Figure 2 is an enlarged sectional view of the rear portion of the improved arresting hook.

Figure 3 is a bottom view of the rear portion of the head member of said hook.

Figure 4 is a top plan view of the tip portion.

Figure 1 shows an arresting hook assembly 1 having an elongated tubular shank portion 2, the forward end of which is formed as a clevis 3 pivoted by bolt 4 for lateral swinging relative to the rearwardly extending arm 5 of bell crank 6. Bell crank 6 is pivotally supported on a transverse shaft 7 carried by suitable bearing brackets 8 rigid with the frame members 9 of the fuselage 10 of an airplane. The bell crank includes a further arm 11 pivotally connected at 12 to the piston rod 13 of a shock absorber and actuating unit 14, the cylinder 15 of which is pivotally connected at 16 to a suitable bracket 17 rigid with the fuselage frame.

The rear end of the hook assembly is formed as a widened head portion 18 having a flat bottom wall 19 and shaped as clearly shown in Figures 1, 2, and 3. Protruding from the bottom wall of the head portion is a cylindrical bearing portion 20 rotatably carrying a grooved roller 21 having anti-friction bushings 22 and 23. Below the roller is a truncated cylinder tip member 24, the circular top wall 25 of which is coaxial with the bearing portion 20 and is clamped against the lower end 26 thereof by means of a bolt 27 passing through apertures 28 and 29 in the walls 25 and 19 respectively. Bolt 27 is provided with a nut 30 and suitable washers 31 and 32. To prevent rotation of tip 24 relative to head 18, the upper wall 25 of the tip carries projections 33 adapted to engage in mating grooves 34 in the lower edge of the bearing portion 20.

A suitable grease fitting 35 communicates with a groove 36 in the outer periphery of the bearing portion 20 to provide for lubrication thereof.

It should be noted that the median plane of the roller 21 is substantially aligned with the longitudinal axis of shank 2. Thus when the cable engages the roller during landing operations, the forces involved are transmitted most effectively along the shank member with a minimum of bending stresses. It is further to be noted that the outside diameter of tip member 24 is substantially the same as the outside diameter of the roller 21 to facilitate the movement of the cable therealong into engagement with the roller. When in its lower operating position as shown in figure 1, the axis of the tip member is inclined rearwardly as shown, thus tending to cause the cable to move upwardly and onto the roller.

The operation of the improved landing hook is believed obvious from the above description. Normally the hook is retained in upwardly swung position adjacent the bottom of the fuselage. When the airplane is prepared for a landing operation, the hook is swung downwardly under the control of the actuator 14 and into a position suitable for engaging the arresting cable on the carrier deck. With the roller-type hook disclosed, it is found possible to smoothly and quickly arrest the forward motion of aircraft of relatively great size and weight with substantially complete freedom from vibration.

While a bushing type of anti-friction bearing for the roller is shown, it is believed obvious that other types of bearings could be employed if so desired.

It is believed obvious that certain other changes could likewise be made without departing from the spirit and scope of the invention as claimed.

I claim as my invention:

1. An arresting hook for an airplane comprising an elongated shank portion pivotally supported from the airplane and adapted to extend generally rearwardly and downwardly therefrom, the rear end of said shank terminating in a head portion having a flat bottom face and a cylindrical bearing portion extending downwardly therefrom, the axis of said bearing portion being perpendicular to the axis of said shank, a cylindrical tip member of larger diameter than said bearing portion rigidly secured to the lower end thereof and coaxially therewith, whereby a circular groove is formed between the upper surface of said tip member and the bottom face of said head portion, the median plane of said groove lying substantially in line with the axis of said shank, and a roller in said groove rotatably mounted on said bearing portion, the outside diameter of said roller being substantially equal to the diameter of said tip member.

2. An arresting hook for an airplane comprising an elongated shank pivotally connected at its forward end to the airplane and adapted to extend rearwardly and downwardly therefrom, a head member rigidly carried by the rear end of said shank and having a cylindrical bearing portion protruding from the lower face thereof, the axis of said bearing portion being substantially perpendicular to the axis of said shank, a roller rotatably mounted on said bearing portion, and a truncated cylindrical tip member rigid with the head member below said bearing portion and coaxial therewith, the outside diameters of said tip member and said roller being substantially equal.

HARRY M. TURNER.

REFERENCES CITED

The following references are of record in the file of this patent:

UNITED STATES PATENTS

| Number | Name | Date |
|---|---|---|
| 1,405,658 | Bazzeghin | Feb. 7, 1922 |
| 1,668,113 | Haase | May 1, 1928 |
| 1,738,261 | Perkins | Dec. 3, 1929 |
| 2,454,257 | Rowe | Nov. 16, 1948 |

FOREIGN PATENTS

| Number | Country | Date |
|---|---|---|
| 558,066 | Great Britain | Dec. 17, 1943 |